US012574130B2

(12) United States Patent
Lo et al.

(10) Patent No.: US 12,574,130 B2
(45) Date of Patent: Mar. 10, 2026

(54) LINEAR BEAM SWEEPING IN HIGH SPEED SCENARIOS

(71) Applicant: Nokia Solutions and Networks Oy, Espoo (FI)

(72) Inventors: Anthony Lo, Bristol (GB); Matthew Baker, Cambridge (GB)

(73) Assignee: Nokia Solutions and Networks Oy, Espoo (FI)

( * ) Notice: Subject to any disclaimer, the term of this patent is extended or adjusted under 35 U.S.C. 154(b) by 119 days.

(21) Appl. No.: 18/294,873

(22) PCT Filed: Aug. 6, 2021

(86) PCT No.: PCT/EP2021/072094
    § 371 (c)(1),
    (2) Date: Feb. 2, 2024

(87) PCT Pub. No.: WO2023/011737
    PCT Pub. Date: Feb. 9, 2023

(65) Prior Publication Data
    US 2024/0430024 A1     Dec. 26, 2024

(51) Int. Cl.
    *H04B 17/309*     (2015.01)
    *H04B 7/06*       (2006.01)
(52) U.S. Cl.
    CPC ......... *H04B 17/347* (2023.05); *H04B 7/0617* (2013.01); *H04B 7/06952* (2023.05)
(58) Field of Classification Search
    CPC ................................................... H04B 17/347
    USPC ........................................................ 375/224
    See application file for complete search history.

(56) References Cited

U.S. PATENT DOCUMENTS

| | | | |
|---|---|---|---|
| 9,287,957 B2 * | 3/2016 | Brown | H04L 1/0026 |
| 2019/0230536 A1 * | 7/2019 | Da Silva | H04L 1/0026 |
| 2020/0196216 A1 | 6/2020 | Hui et al. | |
| 2021/0044029 A1 * | 2/2021 | Yoon | H05K 1/165 |
| 2023/0198590 A1 * | 6/2023 | Kim | H04B 7/0617 |
| | | | 370/329 |

FOREIGN PATENT DOCUMENTS

| | | |
|---|---|---|
| EP | 3280165 A1 | 2/2018 |
| JP | 2020528699 A | 9/2020 |
| WO | 2019/002867 A1 | 1/2019 |

OTHER PUBLICATIONS

"New WID on NR support for high speed train scenario in FR2", 3GPP TSG-RAN Meeting #89-e, RP-202037, Agenda: 9.1.2, Samsung, Sep. 14-19, 2020, pp. 1-5.

(Continued)

*Primary Examiner* — Lihong Yu
(74) *Attorney, Agent, or Firm* — Barta Jones, PLLC

(57)     ABSTRACT

There are provided measures for improvement of linear beam sweeping in high speed scenarios. Such measures exemplarily comprise setting a second beam width characteristic of a second beam of a beam sweep, wherein said setting includes calculating said second beam width characteristic based on a first beam width characteristic of a first beam of said beam sweep and a ratio between a first path loss of said first beam between an antenna and a first position at a linear trajectory to be covered by said beam sweep and a second path loss of said second beam between said antenna and a second position at said linear trajectory.

18 Claims, 13 Drawing Sheets

(a) A Traditional Cellular Deployment Scenario (b) A High-Speed Train Deployment Scenario

(56) References Cited

OTHER PUBLICATIONS

"Revised WID on enhanced NR support for high speed train scenario for frequency range 1 (FR1)", 3GPP TSG RAN Meeting #90e, RP-202335, Agenda: 9.8.20, CMCC, Dec. 7-11, 2020, pp. 1-4.

"3rd Generation Partnership Project; Technical Specification Group Radio Access Network; Study on Scenarios and Requirements for Next Generation Access Technologies; (Release 16)", 3GPP TR 38.913, V16.0.0, Jul. 2020, pp. 1-40.

Balanis, "Antenna Theory: Analysis and Design", John Wiley & Sons, Third Edition, 2005, 1072 pages.

"3rd Generation Partnership Project; Technical Specification Group Radio Access Network; NR; NR support for high speed train scenario in frequency range 2 (FR2) (Release 17)", 3GPP TR 38.854, VO.1.0, May 2021, pp. 1-25.

"3rd Generation Partnership Project; Technical Specification Group Radio Access Network; NR; Requirements for support of radio resource management (Release 17)", 3GPP TS 38.133, V17.2.0, Jun. 2021, 3177 pages.

International Search Report and Written Opinion received for corresponding Patent Cooperation Treaty Application No. PCT/EP2021/072094, dated May 23, 2022, 13 pages.

Office action received for corresponding Japanese Patent Application No. 2024-506937, dated Feb. 25, 2025, 3 pages of office action and no page of translation available.

* cited by examiner

S31

S311 setting a second beam width characteristic of a second beam of a beam sweep

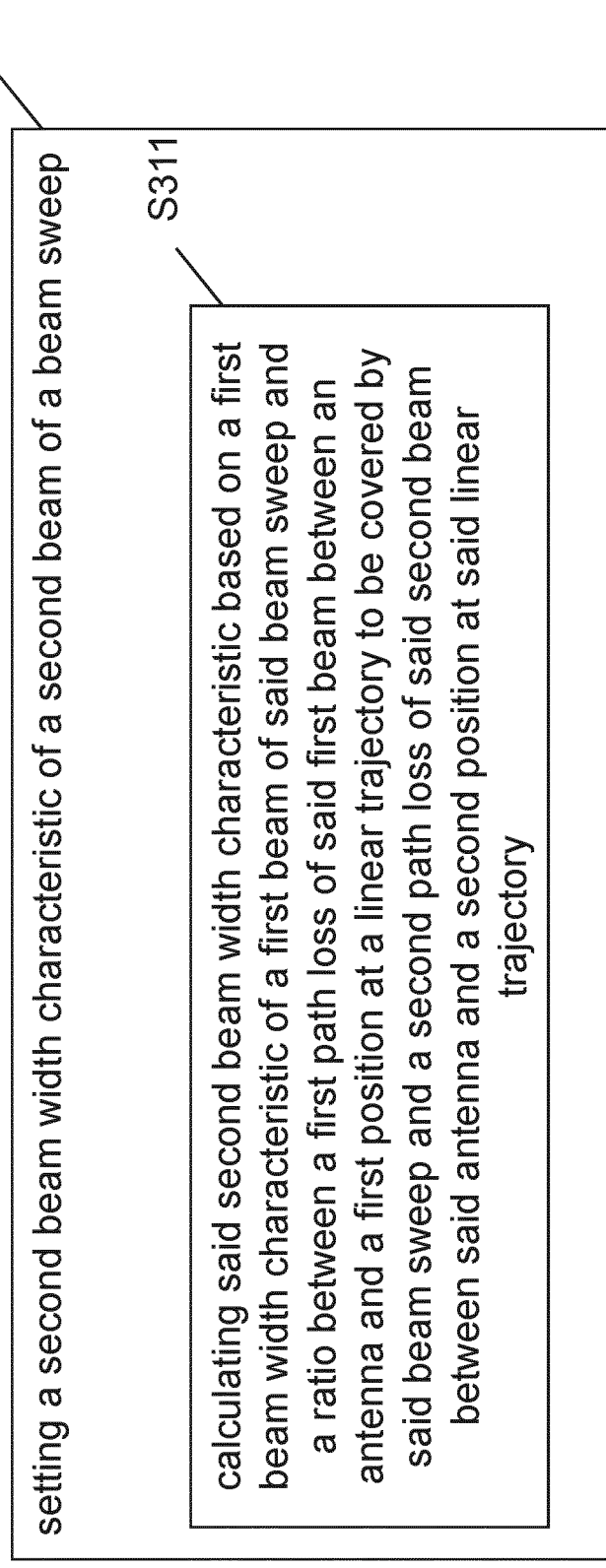

calculating said second beam width characteristic based on a first beam width characteristic of a first beam of said beam sweep and a ratio between a first path loss of said first beam between an antenna and a first position at a linear trajectory to be covered by said beam sweep and a second path loss of said second beam between said antenna and a second position at said linear trajectory

Fig. 3

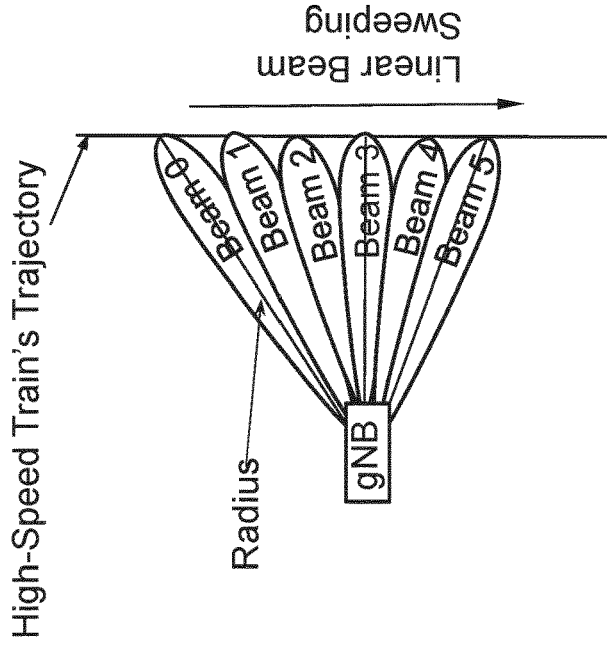
(b) A High-Speed Train Deployment Scenario
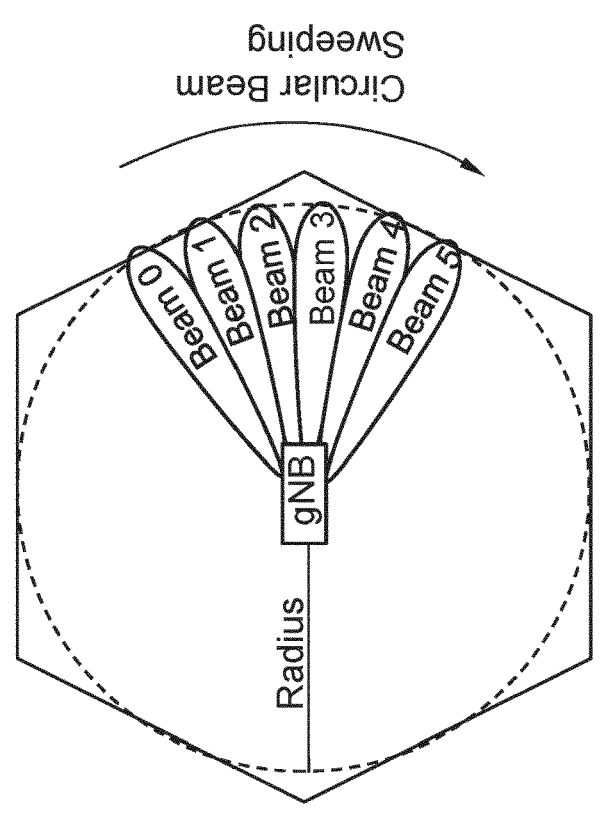
(a) A Traditional Cellular Deployment Scenario
Fig. 4

3D Response Pattern

LINEAR BEAM SWEEPING IN HIGH SPEED SCENARIOS

RELATED APPLICATION

This application claims priority to PCT Patent Application No. PCT/EP2021/072094, filed Aug. 6, 2021, which is incorporated herein by reference in its entirety.

FIELD

Various example embodiments relate to improvement of linear beam sweeping in high speed scenarios. More specifically, various example embodiments exemplarily relate to measures (including methods, apparatuses and computer program products) for realizing improvement of linear beam sweeping in high speed scenarios.

BACKGROUND

The present specification generally relates to a cellular deployment scenario and the radio coverage of a linear trajectory in particular in high-speed scenarios.

More specifically, the present specification relates to the field of wireless communications systems, for example, 5G-NR systems. One promising 5G use case is high-speed train scenarios, which is under discussions in 3GPP. 5G-NR systems face a number of challenges in supporting such scenarios; one major challenge is caused by the multi-beam operation feature of 5G-NR as explained below.

High-speed commercial trains are a popular mode of regional transportation for inter-city (typically, mid-to-long distance) commuters throughout the world. For example, the Shinkansen high-speed railway in Japan, which has been in commercial service since 1964, is used by more than 350 million people every year; and each Shinkansen train can carry more than 1400 passengers. In many countries, high-speed railway networks cover vast geographical areas. China, for instance, has the world's longest high-speed railway network, reaching up to 29000 kilometers by the end of 2018, which will be extended to 38000 kilometers by 2025. The maximum speed of today's high-speed trains is less than 400 kilometers per hour. In the near future, faster high-speed trains (e.g., linear motor or Maglev trains) with speeds of 500 kilometers per hour and beyond will be deployed. As the demand for high-speed rail steadily increases over time, there is a demand to provide mobile broadband services for passengers on such trains by mobile network operators. Consequently, Third Generation Partnership Project (3GPP) has initiated two work items on 5G New Radio (NR) enhancements targeting a mobile speed of up to 500 kilometers per hour. These work items include "New WID on NR support for high-speed train scenarios in Frequency Range 2" [3GPP RP-202037] and "Revised WID on enhanced NR support for high-speed train scenarios for Frequency Range 1" [3GPP RP-202335]. The former work item deals with high-speed train deployment for 5G NR operating in the millimeter-wave band and the latter for sub-6 gigahertz.

FIG. 4 (FIGS. 4(a) and 4(b)) shows a schematic diagram exemplarily illustrating circular beam sweeping and linear beam sweeping. In particular, FIG. 4(a) illustrates a traditional cellular deployment scenario, while FIG. 4(b) illustrates a high-speed train deployment scenario.

FIG. 5 shows a schematic diagram exemplarily illustrating a relationship between a beam radius and beam coverage in linear beam sweeping.

In a traditional 5G NR cellular deployment scenario, a set of identical beams generated by gNB are sequentially swept in a circular manner with a constant radius as shown in FIG. 4(a); the center of the beam sweeping is the gNB node. As the beams are identical (i.e., Half-Power Beam Width (HPBW) is fixed), circular beam sweeping results in uniform beam coverage. In a high-speed train deployment scenario, each beam is directed towards a different position along the path of UE aboard a high-speed train. Typically, the trajectory of a high-speed train is straight, resulting in linear beam sweeping instead of circular as illustrated in FIG. 4(b). Unlike the circular beam sweeping, employing identical beams in the linear beam sweeping procedure would lead to non-uniform beam coverage because the radius of each beam is different as shown in FIG. 4(b). It is important to note that the beam coverage is proportional to the radius given a fixed HPBW. The non-uniform beam coverage problem is further illustrated in FIG. 5. A set of five beams are swept and aimed at a specific position along the UE/CPE's trajectory, denoted by $P_k$ (where k is the beam identification), leading to the following inequality for the beam radius (or length) $r_k$. Here, beam radius (or length) refers to the direct propagation distance between a remote radio head (RRH) and a UE/CPE at $P_k$.

$$r_0 > r_1 > r_2 > r_3 > r_4 \qquad \text{(Equation 1)}$$

The coverage of the kth beam is the segment length $l_k$ along the trajectory. Using Equation (1), a similar inequality can be deduced for the segment length of the different beams, which is given by Equation (2).

$$l_0 > l_1 > l_2 > l_3 > l_4 \qquad \text{(Equation 2)}$$

Beam coverage is generally small in millimeter-wave communications systems as a consequence of employing directional antennas (such as large-scale antenna arrays) along with advanced beamforming techniques at the gNB to form very narrow (pencil) beams. The aforementioned linear beam sweeping can lead to further reduction in the beam coverage. The resultant small coverage poses significant challenges to beam and mobility management procedures. Small coverage implies the amount of time available to complete execution of such procedures is short. In the worst case, the high-speed UE/CPE fails to detect the beam before moving to the coverage of the adjacent beam.

FIG. 6 shows a schematic diagram exemplarily illustrating a series of single-frequency cells for high-speed train scenarios.

In particular, FIG. 6 shows a typical cellular layout for a high-speed train scenario considered by 3GPP. In this scenario, a series of cells are deployed along the railway track, providing continuous radio coverage for user equipment (UE) devices on trains. Each cell consists of one BaseBand Unit (BBU), which is connected to multiple RRHs which communicate with user equipment devices over the air. In the case of a single radio-frequency cell, the i-th BBU simultaneously sends identical signals to J RRHs; the signal is in turn transmitted by each of the J RRHs to the UE device using the same radio frequency. Alternatively, a UE device communicates with the RRH via a Customer Premises Equipment (CPE), which serves as a relay node; the CPE is mounted on rooftop of train carriages. A cluster of RRHs connected to one BBU form a cell in which each RRH may transmit one or more beams in a time sequential manner to cover a spatial area in the cell, which is referred to as beam sweeping.

During beam sweeping, one Synchronization Signal (SS) block is transmitted using one beam in one direction and then the next block is transmitted to a different direction using a different beam and so on. In addition to SS blocks, reference signals such as CSI-RS are also sent using these beams but possibly narrower than those used for SS blocks.

In view of the above, the problem arises that employing identical beams in the linear beam sweeping procedure would lead to non-uniform beam coverage, thereby potentially exacerbating establishing and keeping a radio link to a terminal moving at high speed or even making such establishing and keeping impossible.

Hence, there is a need to provide for improvement of linear beam sweeping in high speed scenarios.

SUMMARY

Various example embodiments aim at addressing at least part of the above issues and/or problems and drawbacks.

Various aspects of example embodiments are set out in the appended claims.

According to an exemplary aspect, there is provided a method of a radio cell controlling entity, the method comprising setting a second beam width characteristic of a second beam of a beam sweep, wherein said setting includes calculating said second beam width characteristic based on a first beam width characteristic of a first beam of said beam sweep and a ratio between a first path loss of said first beam between an antenna and a first position at a linear trajectory to be covered by said beam sweep and a second path loss of said second beam between said antenna and a second position at said linear trajectory.

According to an exemplary aspect, there is provided an apparatus of a radio cell controlling entity, the apparatus comprising setting circuitry configured to set a second beam width characteristic of a second beam of a beam sweep, and calculating circuitry configured to calculate said second beam width characteristic based on a first beam width characteristic of a first beam of said beam sweep and a ratio between a first path loss of said first beam between an antenna and a first position at a linear trajectory to be covered by said beam sweep and a second path loss of said second beam between said antenna and a second position at said linear trajectory.

According to an exemplary aspect, there is provided an apparatus of a radio cell controlling entity, the apparatus comprising at least one processor, at least one memory including computer program code, and at least one interface configured for communication with at least another apparatus, the at least one processor, with the at least one memory and the computer program code, being configured to cause the apparatus to perform setting a second beam width characteristic of a second beam of a beam sweep, wherein in relation to said setting, the at least one processor, with the at least one memory and the computer program code, being configured to cause the apparatus to perform calculating said second beam width characteristic based on a first beam width characteristic of a first beam of said beam sweep and a ratio between a first path loss of said first beam between an antenna and a first position at a linear trajectory to be covered by said beam sweep and a second path loss of said second beam between said antenna and a second position at said linear trajectory.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient linear beam sweeping while avoiding or reducing negative effects of distance differences in case of linear beam sweeping to thereby solve at least part of the problems and drawbacks identified in relation to the prior art.

By way of example embodiments, there is provided improvement of linear beam sweeping in high speed scenarios. More specifically, by way of example embodiments, there are provided measures and mechanisms for realizing improvement of linear beam sweeping in high speed scenarios.

Thus, improvement is achieved by methods, apparatuses and computer program products enabling/realizing improvement of linear beam sweeping in high speed scenarios.

BRIEF DESCRIPTION OF THE DRAWINGS

In the following, the present disclosure will be described in greater detail by way of non-limiting examples with reference to the accompanying drawings, in which FIG. 3 is a schematic diagram of a procedure according to example embodiments, FIG. 4 (FIGS. 4(a) and 4(b)) shows a schematic diagram exemplarily illustrating circular beam sweeping and linear beam sweeping.

DETAILED DESCRIPTION

Figure 1:
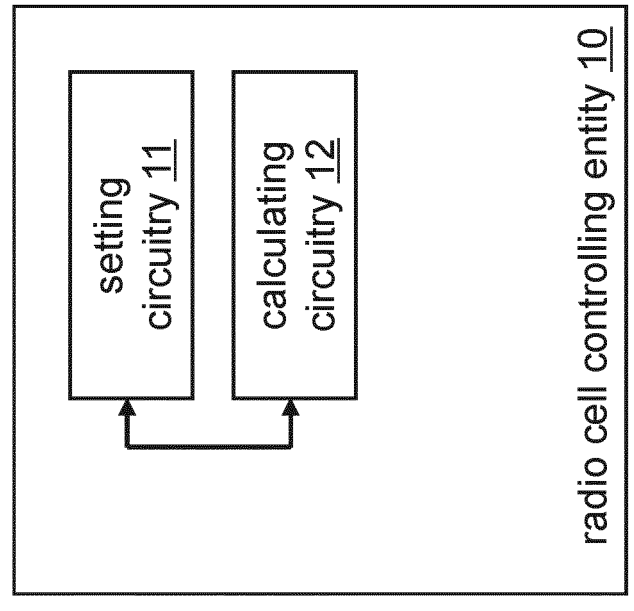
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) improvement of linear beam sweeping in high speed scenarios.

In brief, according to example embodiments, methods and mechanisms are provided to overcome the problem of non-uniform coverage provided by different beams during beam sweeping.

As the coverage differs from one beam to another, example embodiments include a technique to measure coverage of each beam. Unlike in traditional hexagonal cell layout, coverage along the trajectory of UE/CPE is more relevant than coverage area in a high-speed deployment scenario. The technique disclosed herein measures the segment length of the UE/CPE's trajectory covered by a beam based on the beam radius, pointing angles and HPBW of RRH antenna arrays. The segment length of a beam is needed to accurately determine a beam dwelling time which is an essential quantity in radio resource management, where the beam dwelling time is the duration for which a UE/CPE travelling at a constant target speed is within the part of the trajectory covered by the beam.

With regard to the non-uniform coverage problem, example embodiments aim at increasing the segment length of a beam by widening HPBWs of the RRH antenna-array pattern. This means, the original HPBW is widened by a bounded factor. During beam sweeping, a set of beams are swept by an RRH. In the set of beams, the beam with the longest segment length is used as reference for segment length extension of the other beams. The aforementioned bounded factor is derived from the difference in free-space path loss between the reference beam and the beam whose segment length is elongated. The free-space path loss is proportional to the square of beam radius; this means, the reference beam, which has the longest beam radius among all the beams, has the highest free-space path loss. It is important to note that widening HPBW leads to lower directivity of RRH antenna arrays. However, the drop in antenna directivity is compensated by the reduction in free-space path loss for the beam provided the HPBW widening factor does not exceed the difference in free-space path loss with the reference beam. As such, the link quality of the beam is not degraded as compared with the reference beam.

According to alternative example embodiments, the segment length of a beam is decreased by narrowing HPBWs of the RRH antenna-array pattern. This means, the original HPBW is narrowed by the bounded factor. During beam sweeping, a set of beams are swept by an RRH. In the set of beams, the beam with the shortest segment length is used as reference for segment length reduction of the other beams. Similar principles as explained above are applied for this alternative.

Another salient feature of example embodiments is to enable fine tuning of the HPBW widening factor in the azimuth or elevation directions, or a combination of the two in order to maximize/minimize segment length.

Hence, in brief, according to example embodiments, a technique for measuring segment length covered by a beam along the trajectory of UE/CPE based on beam pointing angles, beam radius, and azimuth and elevation HPBWs of RRH antenna arrays is provided.

Further, according to example embodiments, a method of adapting HPBWs of a plurality of beams transmitted from an antenna array is provided, the adaption being dependent on at least beam pointing angles and beam propagation distance to the trajectory of UE/CPE receiver, such that a ratio between HPBWs of different beams with respect to a reference beam within the plurality of beams is bounded by the ratio between the square of beam propagation distances of the respective beams with the reference beam, and such that the respective coverage lengths of the beams along the trajectory are substantially equal.

Example embodiments are specified below in more detail.

FIG. 1 is a block diagram illustrating an apparatus according to example embodiments. The apparatus may be a radio cell controlling entity 10 (e.g. a base band unit) comprising a setting circuitry 11 and a calculating circuitry 12. The setting circuitry 11 sets a second beam width characteristic of a second beam of a beam sweep. The calculating circuitry 12 (may be a portion of said setting circuitry 11 and) calculates said second beam width characteristic based on a first beam width characteristic of a first beam of said beam sweep and a ratio between a first path loss of said first beam between an antenna and a first position at a linear trajectory to be covered by said beam sweep and a second path loss of said second beam between said antenna and a second position at said linear trajectory. FIG. 3 is a schematic diagram of a procedure according to example embodiments. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure according to example embodiments comprises an operation of setting (S31) a second beam width characteristic of a second beam of a beam sweep, wherein said setting (S31) includes an operation of calculating (S311) said second beam width characteristic based on a first beam width characteristic of a first beam of said beam sweep and a ratio between a first path loss of said first beam between an antenna and a first position at a linear trajectory to be covered by said beam sweep and a second path loss of said second beam between said antenna and a second position at said linear trajectory.

Figure 2:
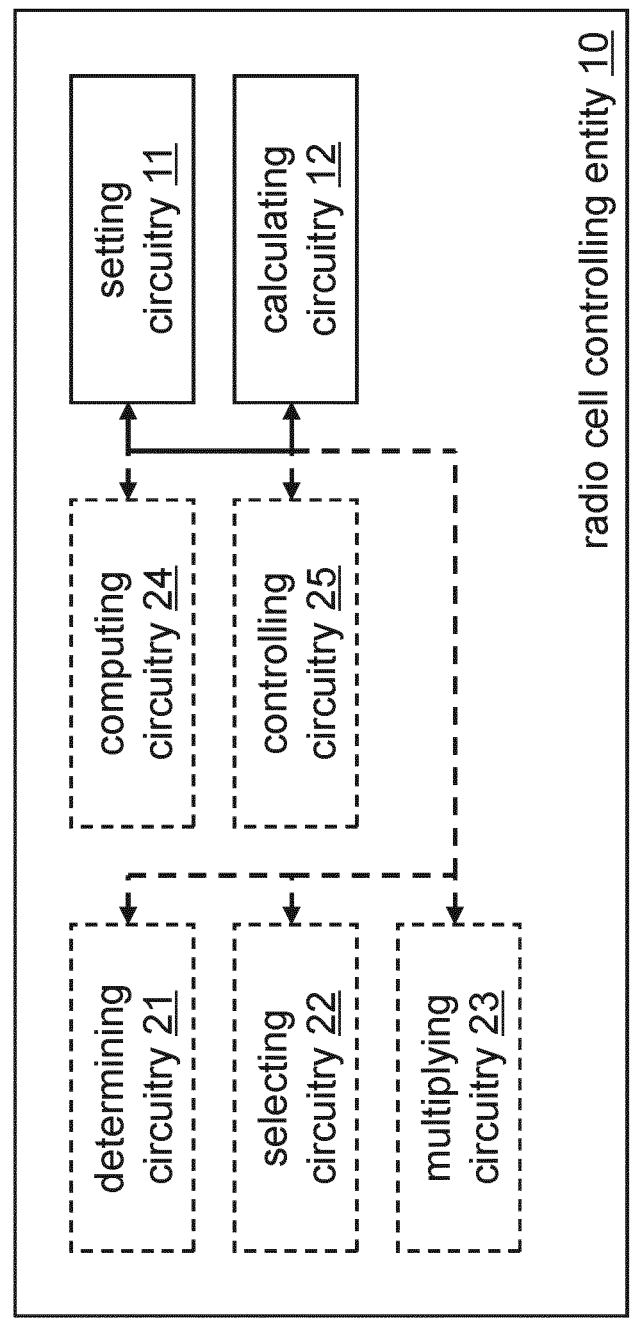
FIG. 2 is a block diagram illustrating an apparatus according to example embodiments.
Figure 5:
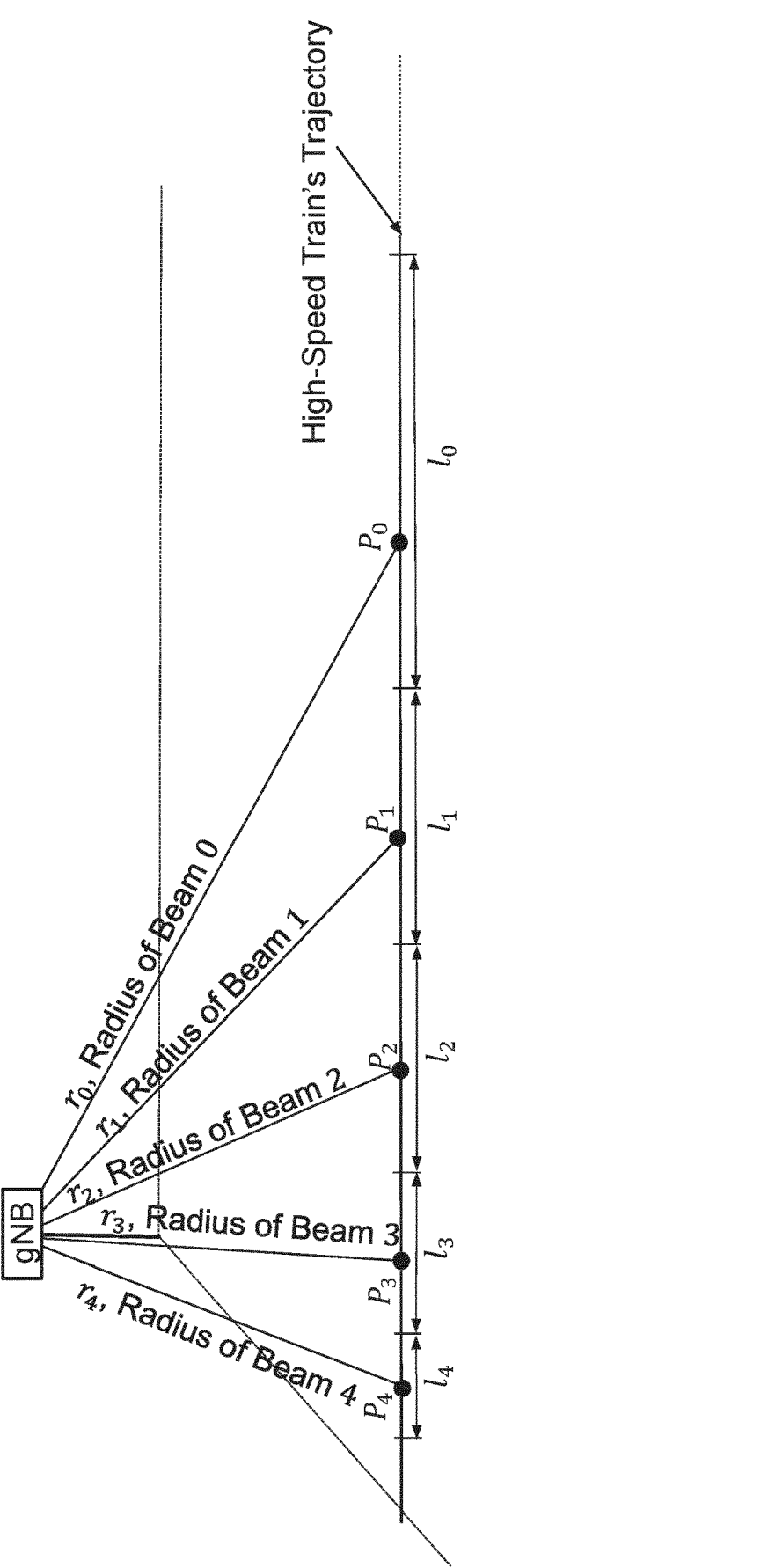
FIG. 5 shows a schematic diagram exemplarily illustrating a relationship between a beam radius and beam coverage in linear beam sweeping.
Figure 6:
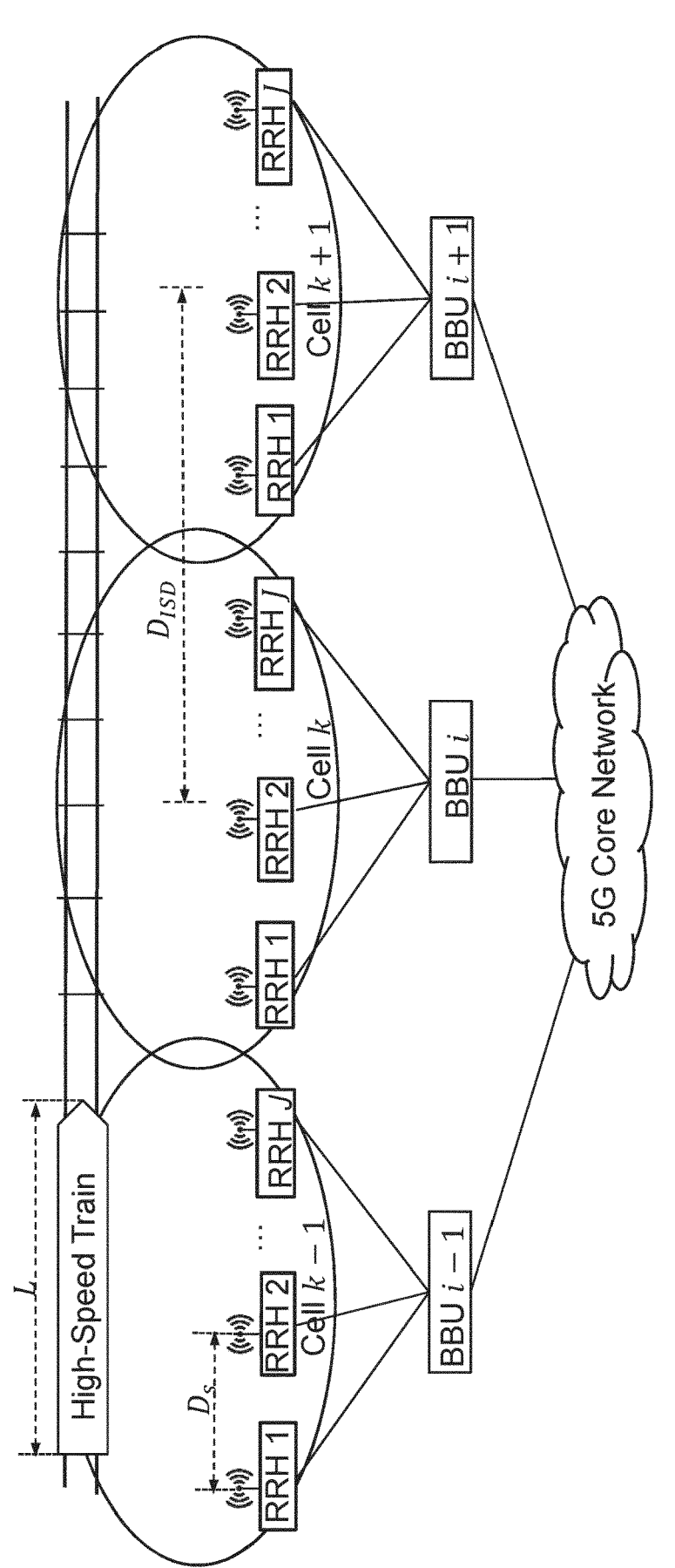
FIG. 6 shows a schematic diagram exemplarily illustrating a series of single-frequency cells for high-speed train scenarios.

FIG. 2 is a block diagram illustrating an apparatus according to example embodiments. In particular, FIG. 2 illustrates a variation of the apparatus shown in FIG. 1. The apparatus according to FIG. 2 may thus further comprise a determining circuitry 21, a selecting circuitry 22, a multiplying circuitry 23, a computing circuitry 24, and/or a controlling circuitry 25.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to further example embodiments, said first path loss corresponds to a first direct propagation length of said first beam, and the second path loss corresponds to a second direct propagation length of said second beam.

According to further example embodiments, said first path loss corresponds to said first direct propagation length, in a first antenna boresight direction for said first beam, between said antenna and said first position, and said second path loss corresponds to said second direct propagation length, in a second antenna boresight direction for said second beam, between said antenna and said second position.

According to a variation of the procedure shown in FIG. 3, exemplary details of the calculating operation (S311) are given, which are inherently independent from each other as such. Such exemplary calculating operation (S311) according to example embodiments may comprise an operation of determining a factor limit value as a square of a quotient of said first direct propagation length and said second direct propagation length, an operation of selecting a factor based on said factor limit value, and an operation of multiplying said first beam width characteristic with said factor.

According to further example embodiments, said factor is a product of a beam width azimuth component factor and a beam width elevation component factor.

According to further example embodiments, said first direct propagation length of said first beam is longer than said second direct propagation length of said second beam, and said factor limit value is an upper limit value for said factor.

According to a variation of the procedure shown in FIG. 3, exemplary details of the calculating operation (S311) are given, which are inherently independent from each other as such. Such exemplary calculating operation (S311) according to example embodiments may comprise an operation of selecting said factor such that a link performance of said second beam is not worse than a link performance of said first beam.

According to further example embodiments, said first direct propagation length of said first beam is shorter than said second direct propagation length of said second beam, and said factor limit value is a lower limit value for said factor.

According to a variation of the procedure shown in FIG. 3, exemplary details of the calculating operation (S311) are given, which are inherently independent from each other as such. Such exemplary calculating operation (S311) according to example embodiments may comprise an operation of selecting said factor such that a link performance of said second beam is not better than a link performance of said first beam.

According to a variation of the procedure shown in FIG. 3, exemplary details of the calculating operation (S311) are given, which are inherently independent from each other as such. Such exemplary calculating operation (S311) according to example embodiments may comprise an operation of selecting said factor such that a dwelling time corresponding to passing a second trajectory length of a second trajectory portion of said linear trajectory to be covered by said second beam fulfilling said second beam width characteristic with a predetermined velocity is higher than a predetermined time period.

According to further example embodiments, said predetermined time period is a minimum time period required for predetermined beam management and mobility procedures.

According to a variation of the procedure shown in FIG. 3, exemplary details of the calculating operation (S311) are given, which are inherently independent from each other as such. Such exemplary calculating operation (S311) according to example embodiments may comprise an operation of selecting said factor such that a second dwelling time corresponding to passing a second trajectory length of a second trajectory portion of said linear trajectory to be covered by said second beam fulfilling said second beam width characteristic with a predetermined velocity is not less than a first dwelling time corresponding to passing a first trajectory length of a first trajectory portion of said linear trajectory to be covered by said first beam fulfilling said first beam width characteristic with said predetermined velocity.

According to further example embodiments, said second beam width characteristic of said second beam is selected such that a received power of said second beam is above a predetermined threshold.

According to further example embodiments, said second beam width characteristic of said second beam is selected such that a link loss of said second beam is below a predetermined threshold.

According to a variation of the procedure shown in FIG. 3, exemplary details of the calculating operation (S311) are given, which are inherently independent from each other as such. Such exemplary calculating operation (S311) according to example embodiments may comprise an operation of selecting said factor such that a second trajectory length of a second trajectory portion of said linear trajectory to be covered by said second beam fulfilling said second beam width characteristic is substantially equal to a first trajectory length of a first trajectory portion of said linear trajectory to be covered by said first beam fulfilling said first beam width characteristic.

According to a variation of the procedure shown in FIG. 3, exemplary additional operations are given, which are inherently independent from each other as such. According to such variation, an exemplary method according to example embodiments may comprise an operation of computing said second trajectory length of said second trajectory portion based on said second beam width characteristic, said second direct propagation length, and at least one of a second azimuth beam pointing angle and a second elevation beam pointing angle, corresponding to said second antenna boresight direction for said second beam, from said antenna to said second position.

According to a variation of the procedure shown in FIG. 3, exemplary additional operations are given, which are inherently independent from each other as such. According to such variation, an exemplary method according to example embodiments may comprise an operation of computing said first trajectory length of said first trajectory portion based on said first beam width characteristic, said first direct propagation length, and at least one of a first azimuth beam pointing angle and a first elevation beam pointing angle, corresponding to said first antenna boresight direction for said first beam, from said antenna to said first position.

According to a variation of the procedure shown in FIG. 3, exemplary additional operations are given, which are inherently independent from each other as such. According to such variation, an exemplary method according to example embodiments may comprise an operation of computing a plurality of trajectory lengths of a plurality of trajectory portions of said linear trajectory to be covered by a plurality of beams fulfilling said first beam width characteristic based on said first beam width characteristic, a plurality of direct propagation lengths, in a plurality of antenna boresight directions for said plurality of beams, between said antenna and a plurality of positions at said linear trajectory, and at least one of a plurality of azimuth beam pointing angles and elevation beam pointing angles, corresponding to said plurality of antenna boresight directions, from said antenna to said plurality of positions at said linear trajectory, and an operation of selecting, among said plurality of beams, a beam having a longest trajectory length among said plurality of trajectory lengths as said first beam.

According to a variation of the procedure shown in FIG. 3, exemplary additional operations are given, which are inherently independent from each other as such. According to such variation, an exemplary method according to example embodiments may comprise an operation of computing a plurality of trajectory lengths of a plurality of trajectory portions of said linear trajectory to be covered by a plurality of beams fulfilling said first beam width characteristic based on said first beam width characteristic, a plurality of direct propagation lengths, in a plurality of antenna boresight directions for said plurality of beams, between said antenna and a plurality of positions at said linear trajectory, and at least one of a plurality of azimuth beam pointing angles and elevation beam pointing angles, corresponding to said plurality of antenna boresight directions, from said antenna to said plurality of positions at said linear trajectory, and an operation of selecting, among said plurality of beams, a beam having a shortest trajectory length among said plurality of trajectory lengths as said first beam.

According to further example embodiments, each respective trajectory length of said plurality of trajectory lengths corresponds to a respective length of a respective intersection between said linear trajectory and a respective ellipse formed by said respective beam intersecting with a respective plane defined by said linear trajectory and a respective horizontal line crossing said linear trajectory perpendicular to said linear trajectory.

According to further example embodiments, each respective trajectory length of said plurality of trajectory lengths is computed as $$l_k = y_2 - y_1$$

with $$y_1 = \frac{-\beta - \sqrt{\beta^2 - 4\alpha\gamma}}{2\alpha}$$

10

-continued
$$y_2 = \frac{-\beta + \sqrt{\beta^2 - 4\alpha\gamma}}{2\alpha}$$

with $$\alpha = a^2\cos^2\phi_k + b^2\sin^2\phi_k$$

$$\beta = 2[y_c(-a^2\cos^2\phi_k - b^2\sin^2\phi_k) + (u - x_c)(b^2\cos\phi_k\sin\phi_k - a^2\cos\phi_k\sin\phi_k)]$$

$$\gamma = y_c^2(a^2\cos^2\phi_k + b^2\sin^2\phi_k) + 2y_c(u - x_c)(a^2\cos\phi_k\sin\phi_k - b^2\cos\phi_k\sin\phi_k) + (u - x_c)^2 a^2\sin^2\phi_k + (u - x_c)^2 b^2\cos^2\phi_k - a^2 b^2$$

wherein a is a respective semimajor axis of said respective ellipse, b is a respective semiminor axis of said respective ellipse, $\Phi_k$ is a respective azimuth beam pointing angle corresponding to said respective antenna boresight direction, from said antenna to said respective position at said linear trajectory, $x_c$ is a respective distance component from said antenna to a respective center of said respective ellipse in a direction perpendicular to said linear trajectory, $y_c$ is a respective distance component from said antenna to said respective center of said respective ellipse in a direction parallel to said linear trajectory, and u is a respective distance component from said antenna to said respective position at said linear trajectory in said direction perpendicular to said linear trajectory.

According to further example embodiments, said first beam width characteristic of said first beam is a first fractional-power beam width of said first beam, and said second beam width characteristic of said second beam is a second fractional-power beam width of said second beam.

According to further example embodiments, said first fractional-power beam width comprises a first fractional-power beam width azimuth component of said first beam and a first fractional-power beam width elevation component of said first beam, and said second fractional-power beam width comprises a second fractional-power beam width azimuth component of said second beam and a second fractional-power beam width elevation component of said second beam. In some such embodiments, the fractional power beam widths may, for example, be half-power beam widths.

According to a variation of the procedure shown in FIG. 3, exemplary additional operations are given, which are inherently independent from each other as such. According to such variation, an exemplary method according to example embodiments may comprise an operation of controlling an antenna device including said antenna to perform said beam sweep based on said first beam width characteristic of said first beam and said second beam width characteristic of said second beam.

According to further example embodiments, said antenna includes an antenna array.

Example embodiments outlined and specified above are explained below in more specific terms.

In the high-speed train deployment scenario, one key cellular design parameter is the beam coverage provided by different beams emanated from the RRH, which is defined as the segment length $l_k$ covered by the kth beam along the trajectory of UE/CPE. Herein, a mathematical expression for $l_k$ is derived. Heretofore, a cellular network model for high-speed train deployment is considered, comprising one RRH located at the point $G(0,0,h_{RRH})$ as depicted in FIG. 7, where $h_{RRH}$ is the RRH height in meters.

Figure 7:
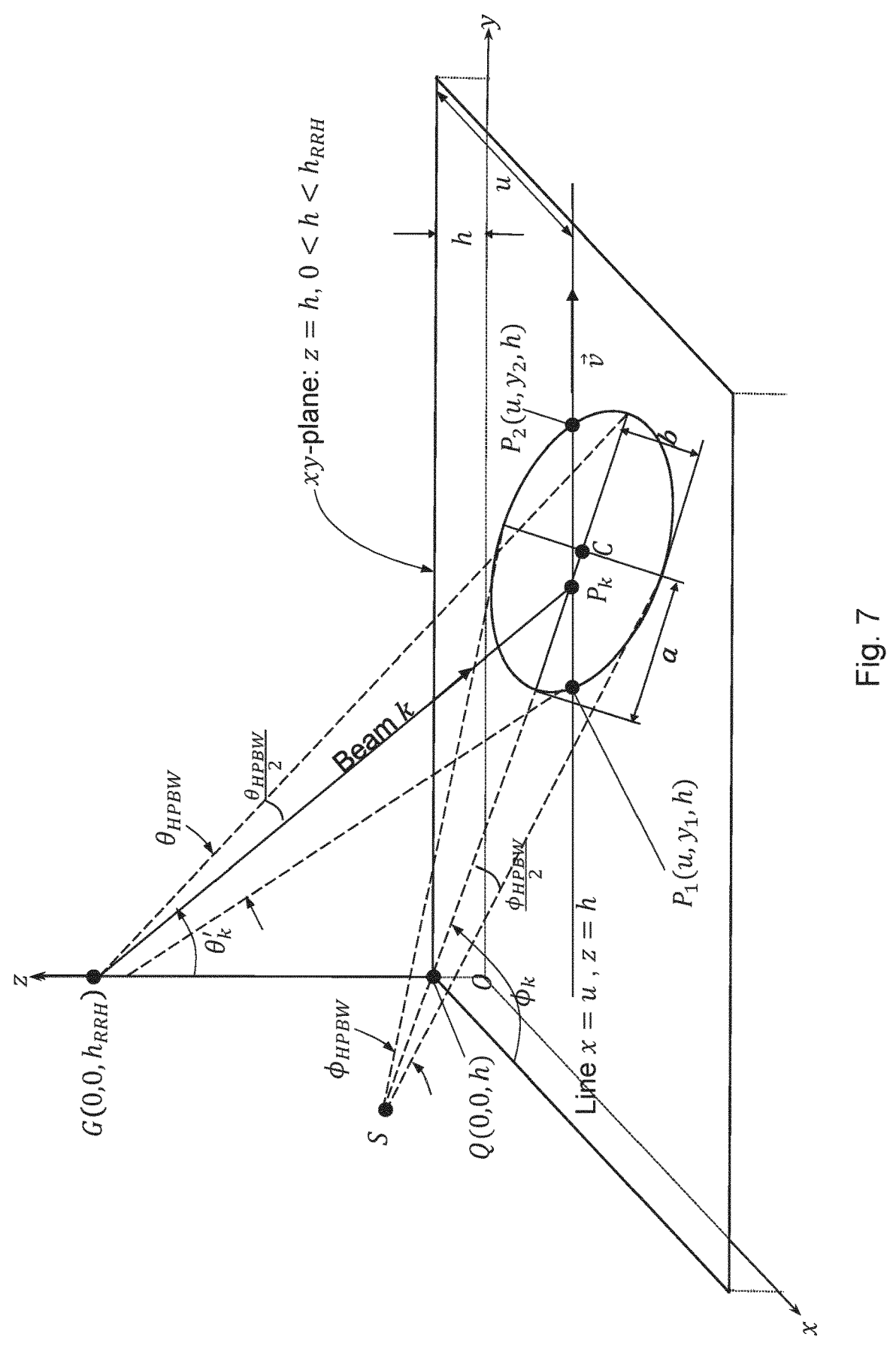
FIG. 7 shows a schematic diagram illustrating calculation principles of beam footprints according to example embodiments.

FIG. 7 shows a schematic diagram illustrating calculation principles of beam footprints according to example embodiments.

The RRH is equipped with a uniform rectangular planar antenna array that is capable of generating a set of K beams during beam sweeping. For 5G-NR operation in the millimeter-wave frequency range, K is up to 64. All of the beams have equal half-power beam width. An example beam can be found in FIG. 8.

Figure 8:
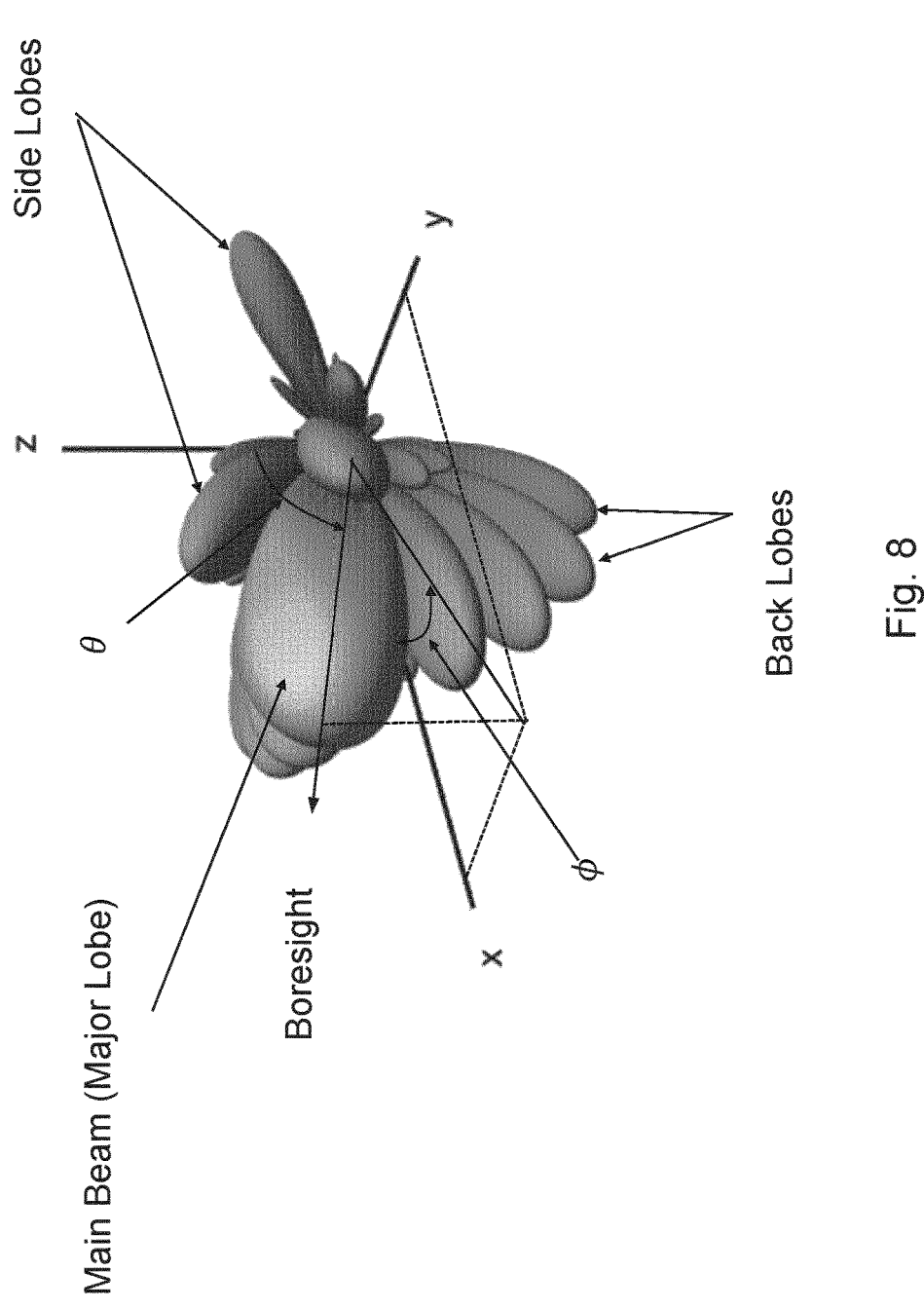
FIG. 8 shows a schematic diagram exemplarily illustrating a radiation pattern of an antenna array.

FIG. 8 shows a schematic diagram exemplarily illustrating a radiation pattern of an antenna array, and in particular picturing a typical antenna-array pattern.

Figure 9:
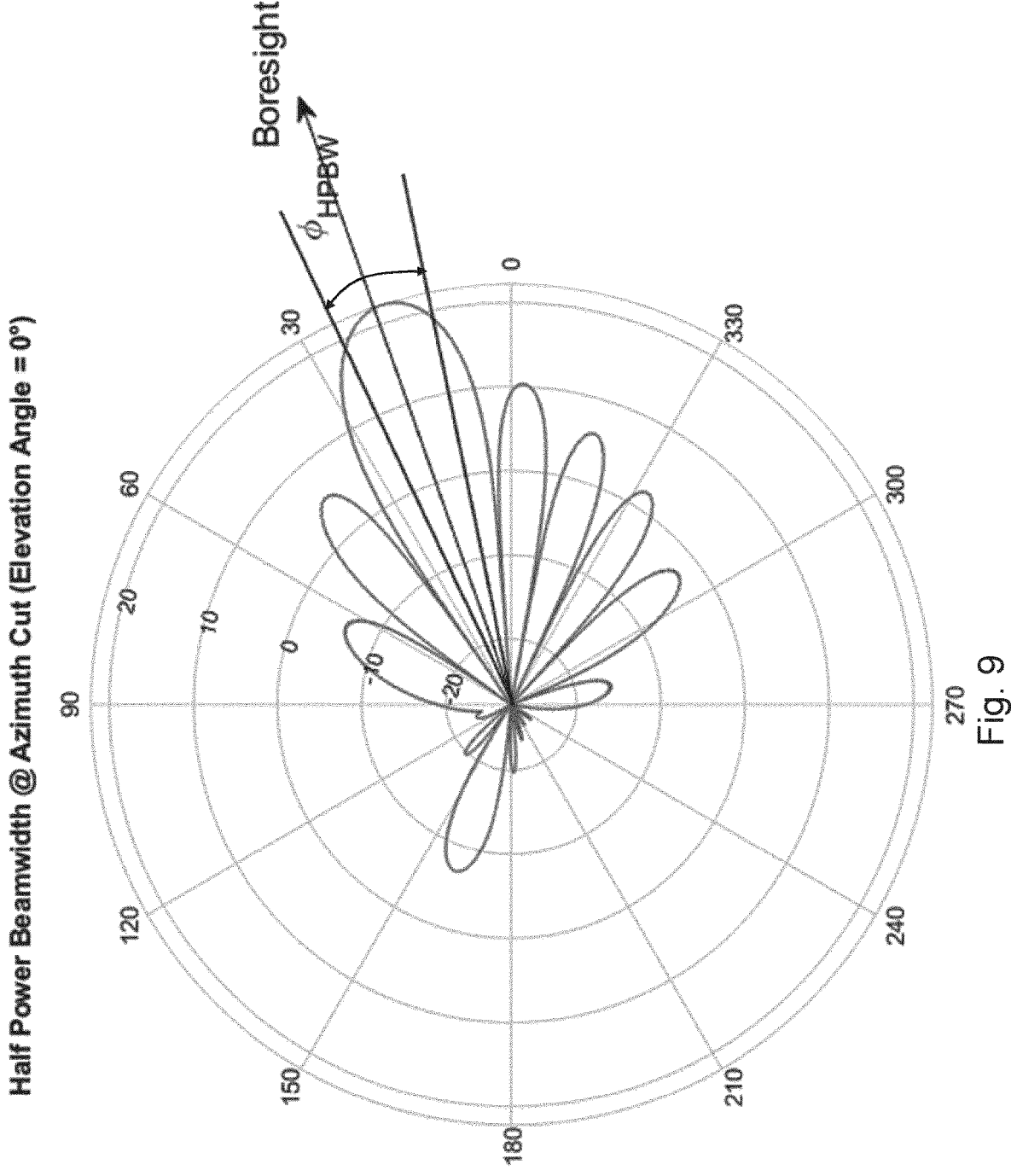
FIG. 9 shows a schematic diagram exemplarily illustrating a two-dimensional radiation pattern on the spherical azimuth plane.
Figure 10:
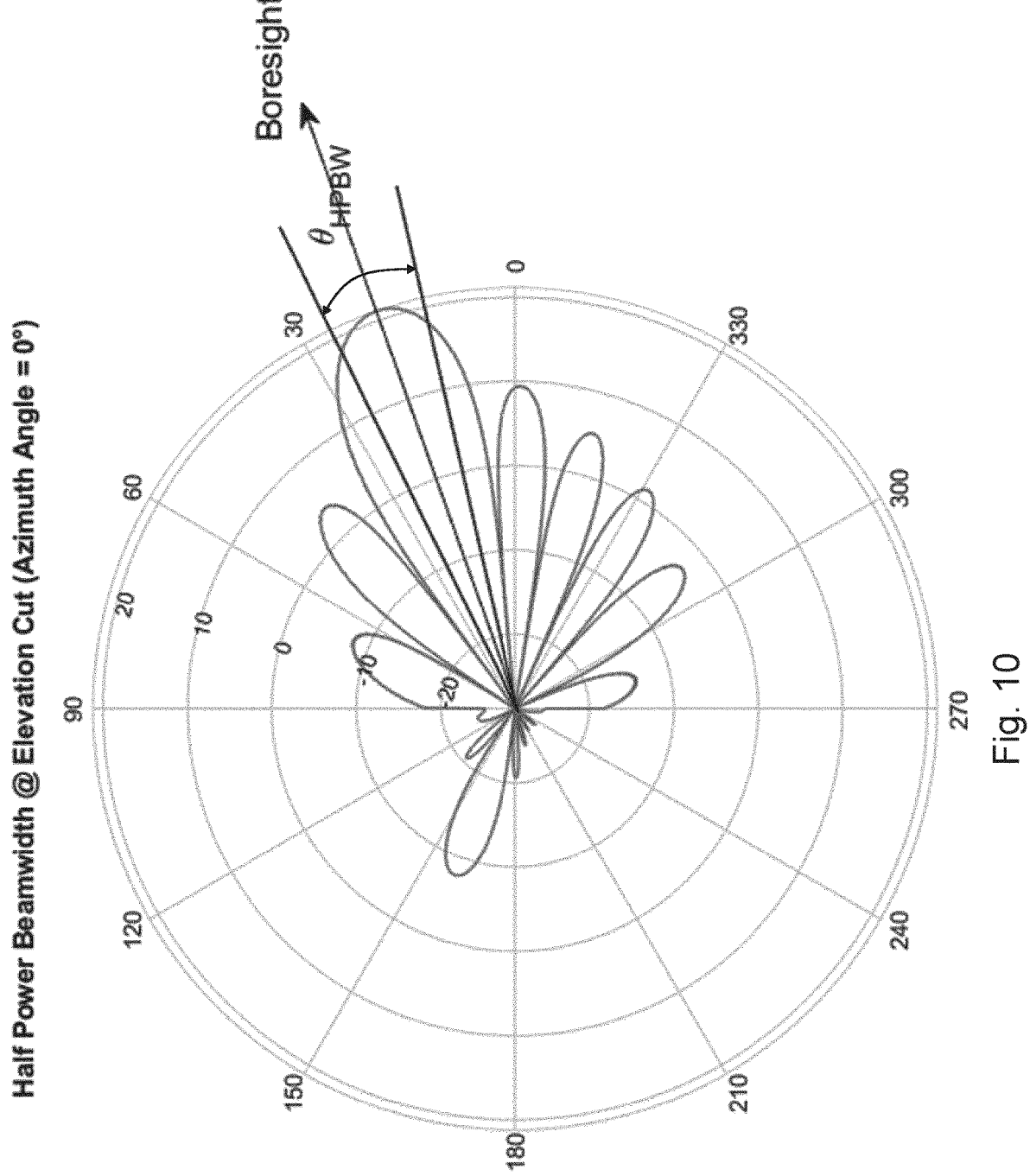
FIG. 10 shows a schematic diagram exemplarily illustrating a two-dimensional radiation pattern on the spherical elevation plane.

The RRH antenna array lies in the yz-plane at the origin of the spherical coordinate system. The direction of the beam is governed by the direction of maximum radiation in the antenna-array pattern, which is also known as antenna-array boresight. The boresight is defined by an ordered pair of spherical coordinates $(\phi,\theta)$; $\phi$ is the azimuth angle between the positive x-axis and the vertical projection of the boresight on the xy-plane, and $\theta$ is the elevation angle that the boresight makes with the positive z-axis. The antenna-array Half-Power Beam Width (HPBW) (as an example of a fractional-power beam width) measured in degrees is the angular separation between two directions in which the radiation intensity is reduced by one-half with reference to the peak value at the boresight. The HPBW defined in the spherical azimuth plane is denoted by $\phi_{HPBW}$ and the one in the spherical elevation plane is $\theta_{HPBW}$ as illustrated in FIGS. 9 and 10, respectively, where +FIG. 9 shows a schematic diagram exemplarily illustrating a two-dimensional radiation pattern on the spherical azimuth plane, while FIG. 10 shows a schematic diagram exemplarily illustrating a two-dimensional radiation pattern on the spherical elevation plane.

The array-antenna boresight for the kth beam is oriented towards a point $P_k(u, y_k, h)$ which is along the trajectory of UE/CPE, where k is $1 \leq k \leq K$. Hence, beam k can be represented by a vector $\overrightarrow{GP_k}$; its magnitude or length, denoted by $|\overrightarrow{GP_k}|$, is equal to the beam radius (or length) $r_k$. As the UE/CPE aboard a high-speed train is moving with constant velocity $\vec{v}$ (i.e., speed and direction of motion do not change), it is valid to assume the UE/CPE's trajectory is a straight line, which is defined by a pair of equations: x=u, z=h. The line is parallel to the y-axis and the distance between them is u meters, and h meters above the origin O.

The direction of the vector $\overrightarrow{GP_k}$ is defined by the elevation pointing angle $\theta'_k$ and the azimuth pointing angle $\phi_k$. As shown in FIG. 7, $\theta'_k$ is the angle between the two vectors $\overrightarrow{GP_k}$ and $\overrightarrow{GQ}$, which can be determined by applying the dot product formula as follows:

$$\theta'_k = \cos^{-1}\left(\frac{\overrightarrow{GP_k} \cdot \overrightarrow{GQ}}{|\overrightarrow{GP_k}||\overrightarrow{GQ}|}\right) \qquad \text{(Equation 3)}$$

where $|\overrightarrow{GP_k}|$ and $|\overrightarrow{GQ}|$ are the magnitude of $\overrightarrow{GP_k}$ and $\overrightarrow{GQ}$, respectively.

In order to determine $\phi_k$, a counterclockwise rotation of the vector $\overrightarrow{GP_k}$ centred at the point $P_k$ until it lies in the plane z=h yields $\overrightarrow{SP_k}$; a similar rotation is also applied to $\overrightarrow{GC}$ about the point $C(x_c, y_c, z_c=h)$, which produces $\overrightarrow{SC}$. The two vectors $\overrightarrow{QP_k}$ and $\overrightarrow{QC}$ are the orthogonal projection of the vectors $\overrightarrow{GP_k}$ and $\overrightarrow{GC}$, respectively, on to the plane z=h. Hence, $\overrightarrow{QP_k}$, $\overrightarrow{QC}$, $\overrightarrow{SP_k}$ and $\overrightarrow{SC}$ are collinear vectors and $\phi_k$ is the angle between these collinear vectors and the positive x-axis, which is given by $$\phi_k = \tan^{-1}\left(\frac{y_k}{u}\right) \qquad \text{(Equation 4)}$$

In short, the vector $\overrightarrow{GP_k}$, which represents beam k, is also defined by ordered triples $(r_k, \phi_k, \theta'_k)$.

In general, the footprint of beam k which is projected on to the plane of the UE/CPE's trajectory (i.e., the xy-plane z=h in FIG. 7) has an elliptical shape with its center at C $(x_c, y_c, z_c)$, semimajor axis a and semiminor axis b as illustrated in FIG. 7. The equation of such an ellipse is defined by $$\frac{[(x - x_c)\cos\phi_k + (y - y_c)\sin\phi_k]^2}{a^2} + \qquad \text{(Equation 5a)}$$

$$\frac{[(y - y_c)\cos\phi_k - (x - x_c)\sin\phi_k]^2}{b^2} = 1, z = h, 0 < h < h_{RRH}$$

where $$a = \frac{|\overrightarrow{GQ}|}{2}\left[\tan\left(\theta'_k + \frac{\theta_{HPBW}}{2}\right) - \tan\left(\theta'_k - \frac{\theta_{HPBW}}{2}\right)\right], \qquad \text{(Equation 5b)}$$

$$\left(\theta'_k - \frac{\theta_{HPBW}}{2}\right) < \theta'_k < \left(\theta'_k + \frac{\theta_{HPBW}}{2}\right) < 90°$$

$$b = \frac{|\overrightarrow{GQ}|\sec(\theta'_c)}{|\overrightarrow{GC}|}\tan\left(\frac{\phi_{HPBW}}{2}\right) \qquad \text{(Equation 5c)}$$

$$x_c = \frac{|\overrightarrow{QC}|}{\sqrt{1 + \left(\frac{y_k}{u}\right)^2}}, y_c = \frac{y_k}{u}x_c, z_c = h \qquad \text{(Equation 5d)}$$

From trigonometry, $|\overrightarrow{QC}|$ can be derived from the elevation HPBW $\theta_{HPBW}$, elevation pointing angle $\theta'_k$, semimajor axis a and the magnitude of $\overrightarrow{GQ}$ as follows:

$$|\overrightarrow{QC}| = |\overrightarrow{GQ}|\tan\left(\theta'_k - \frac{\theta_{HPBW}}{2}\right) + a \qquad \text{(Equation 6)}$$

In the equation of the semi-minor axis (Equation (5c)), $\theta'_c$ is the angle between the vectors $\overrightarrow{GQ}$ and $\overrightarrow{GC}$, which can be expressed in terms of the semi-major axis a, elevation HPBW $\theta_{HPBW}$ and elevation pointing angle $\theta'_k$.

$$\theta'_c = \tan^{-1}\left(\tan\left(\theta'_k - \frac{\theta_{HPBW}}{2}\right) + \frac{a}{|\overrightarrow{GQ}|}\right) \qquad \text{(Equation 7)}$$

Referring to FIG. 7, the segment length of the UE/CPE's trajectory covered by the footprint of beam k is the line segment joining the points $P_1(u, y_1, h)$ and $P_2(u, y_2, h)$, which are the intersection points of the ellipse with the line $x=u$, $z=h$. In determining these two points, substituting $x=u$ into Equation (5a) and rewrite it as a quadratic equation for $y$ gives $$\alpha y^2 + \beta y + \gamma = 0 \tag{Equation 8a}$$

where the coefficients are $$\alpha = a^2 \cos^2 \phi_k + b^2 \sin^2 \phi_k \tag{Equation 8b}$$

$$\beta = 2\left[y_c\left(-a^2\cos^2\phi_k - b^2\sin^2\phi_k\right) + (u - x_c)\right. \tag{Equation 8c}$$
$$\left.\left(b^2\cos\phi_k\sin\phi_k - a^2\cos\phi_k\sin\phi_k\right)\right]$$

$$\gamma = y_c^2\left(a^2\cos^2\phi_k + b^2\sin^2\phi_k\right) + 2y_c(u - x_c)\left(a^2\cos\phi_k\sin\phi_k - \right. \tag{Equation 8d}$$
$$\left. b^2\cos\phi_k\sin\phi_k\right) + (u - x_c)^2 a^2 \sin^2\phi_k +$$
$$(u - x_c)^2 b^2 \cos^2\phi_k - a^2 b^2$$

The two solutions to the quadratic equation are $$y_1 = \frac{-\beta - \sqrt{\beta^2 - 4\alpha\gamma}}{2\alpha}, \; y_2 = \frac{-\beta + \sqrt{\beta^2 - 4\alpha\gamma}}{2\alpha} \tag{Equation 9}$$

The segment length $l_k$ (in meters) of the UE/CPE's trajectory covered by beam k is given by $$l_k = y_2 - y_1 \tag{Equation 10}$$

Thus, the dwelling time $t_k$ (in seconds) for beam k is defined by $$t_k = \frac{l_k}{|\vec{v}|} \tag{Equation 11}$$

In order to determine the width of the footprint provided by beam k, it is the points of intersection of the ellipse with a straight line passing through $P_k(u, y_k, h)$ perpendicular to the line $x=u$, $z=h$. Using the same approach as for the derivation of $l_k$ and substituting $y=y_k$ into Equation (5a), a quadratic equation is obtained in terms of x.

$$\alpha' x^2 + \beta' x + \gamma' = 0 \tag{Equation 12a}$$

where the coefficients are $$\alpha' = a^2 \sin^2 \phi_k + b^2 \cos^2 \phi_k \tag{Equation 12b}$$

$$\beta' = 2\left[x_c\left(-a^2\sin^2\phi_k - b^2\cos^2\phi_k\right) + \right. \tag{Equation 12c}$$
$$\left.(y_k - y_c)\left(b^2\cos\phi_k\sin\phi_k - a^2\cos\phi_k\sin\phi_k\right)\right]$$

-continued $$\gamma' = x_c^2\left(a^2\sin^2\phi_k + b^2\cos^2\phi_k\right) + \tag{Equation 12d}$$
$$2x_c(y_k - y_c)\left(a^2\cos\phi_k\sin\phi_k - b^2\cos\phi_k\sin\phi_k\right) +$$
$$(y_k - y_c)^2 a^2 \cos^2\phi_k + (y_k - y_c)^2 b^2 \sin^2\phi_k$$

The two solutions to the quadratic equation are $$x_1 = \frac{-\beta' - \sqrt{\beta'^2 - 4\alpha'\gamma'}}{2\alpha'}, \; x_2 = \frac{-\beta' + \sqrt{\beta'^2 - 4\alpha'\gamma'}}{2\alpha'} \tag{Equation 13}$$

The width $w_k$ (in meters) of the footprint defined by beam k is expressed as $$w_k = x_2 - x_1 \tag{Equation 14}$$

Figure 11:
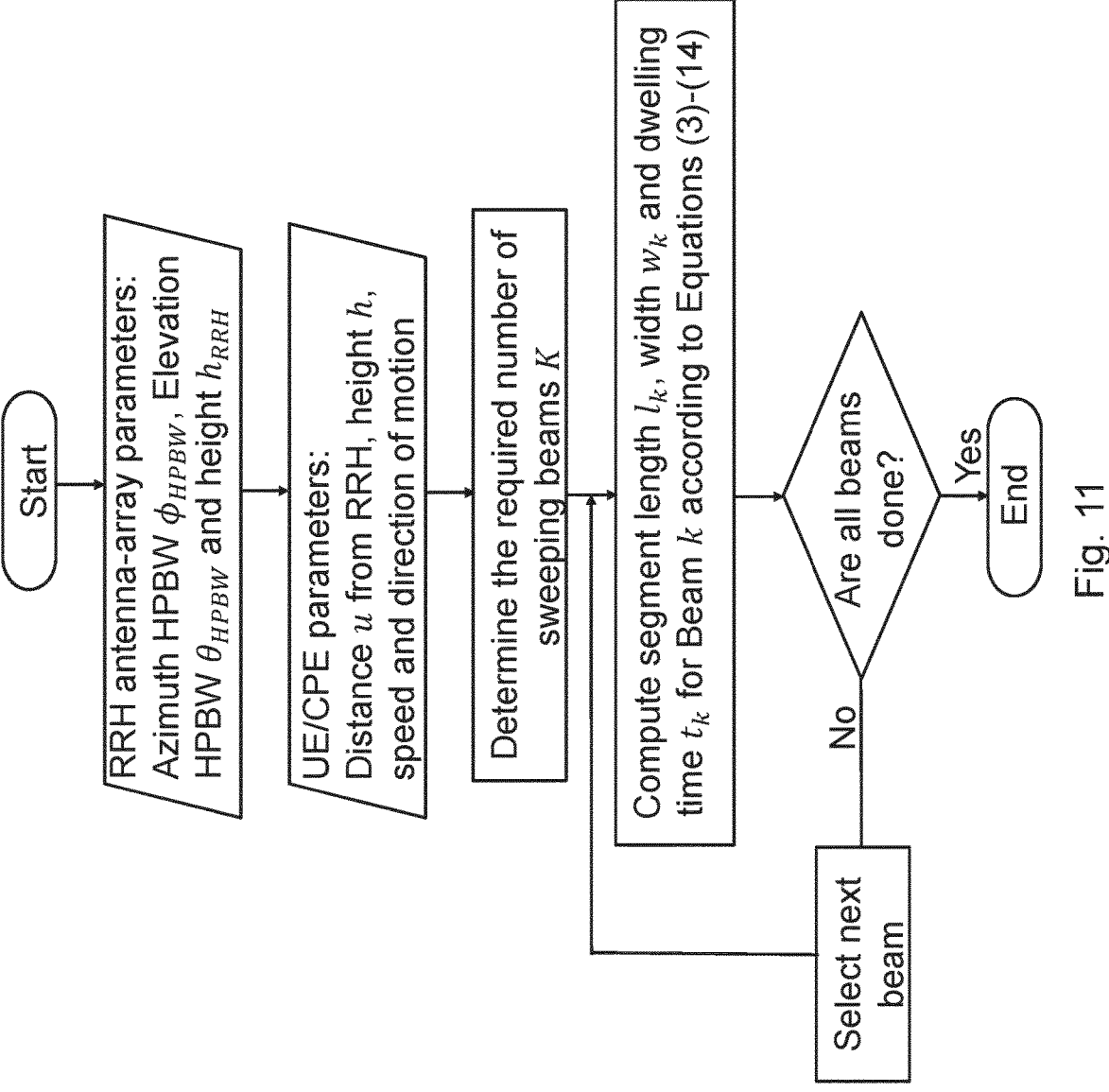
FIG. 11 is a schematic diagram of a procedure according to example embodiments.

FIG. 11 is a schematic diagram of a procedure according to example embodiments, and in particular illustrates a flowchart depicting a method for computing beam segment length, width, and dwelling time according to example embodiments. More particularly, FIG. 11 depicts a flowchart of an exemplary method for measuring the segment length $l_k$, width $w_k$ and dwelling time $t_k$ applying the aforementioned equations in accordance with example embodiments.

As illustrated in FIG. 11, first, RRH antenna-array parameters Azimuth HPBW $\phi_{HPBW}$, Elevation HPBW $\theta_{HPBW}$ and height $h_{RRH}$ are determined.

Further, UE/CPE parameters Distance u from RRH, height h, speed and direction of motion are determined.

Furthermore, the required number of sweeping beams K is determined.

Still further, segment length $l_k$, width $w_k$ and dwelling time $t_k$ for Beam k are computed according to Equations (3)-(14).

If the computation is done for all beams, the processing of FIG. 11 ends.

Otherwise, the next beam is selected, and the computation is performed for the newly selected beam.

The table below (exemplarily illustrating beam coverage length, width, and dwelling time for different beam radii) provides the segment length, width, and the beam dwelling time for different beam radii for an example of high-speed train deployment. $l_k$ and $w_k$ are computed using Equations (10) and (14), respectively, based on u=10 m, $\theta_{HPBW}$=12.6°, $\phi_{HPBW}$=12.6° and 0<$y_k$<90 meters. As the beam radius $r_k$ reduces, the segment length $l_k$ decreases faster than the beam coverage width $w_k$. For UE/CPE's speed of 500 km/h, the dwelling time $t_k$ of Beam 2-5 is shorter than the minimum time required by the beam and mobility management procedures. Consequently, these beams with such a short beam segment length $l_k$ are impractical for high-speed train deployment.

| u = 10 m, $\theta_{HPBW}$ = 12.6°, $\phi_{HPBW}$ = 12.6° | | | | | | |
|---|---|---|---|---|---|---|
| Beam k | $r_k = \lvert GP_k \rvert$ | $\theta'_k$ | $\phi_k$ | $l_k$ | $w_k$ | $t_k$ |
| 0 | 86 m | 83° | 83° | 813 m | 60 m | 6.0 s |
| 1 | 71 m | 81° | 81° | 171 m | 26 m | 1.2 s |
| 2 | 52 m | 79° | 79° | 57 m | 14 m | 0.4 s |

-continued

| u = 10 m, $\theta_{HPBW}$ = 12.6°, $\phi_{HPBW}$ = 12.6° | | | | | | |
|---|---|---|---|---|---|
| Beam k | $r_k = |GP_k^r|$ | $\theta'_k$ | $\phi_k$ | $l_k$ | $w_k$ | $t_k$ |
| 3 | 42 m | 76° | 76° | 34 m | 10 m | 0.2 s |
| 4 | 24 m | 66° | 63° | 10 m | 6 m | 0.07 s |
| 5 | 17 m | 55° | 45° | 5 m | 5 m | 0.04 s |

The aforementioned short beam segment length $l_k$ is due to shrinking in footprint sizes of beam k. Examining Equation (5a), the beam footprint size is a function of the semimajor axis a and semiminor axis b of the ellipse. From Equations (5a) and (5b), it can be observed that one key parameter that influences the magnitude of a and b is the elevation HPBW $\theta_{HPBW}$ and azimuth HPBW $\phi_{HPBW}$. Presently, in the linear beam sweeping, the $\theta_{HPBW}$ and $\phi_{HPBW}$ are fixed for all K beams. To this end, according to example embodiments, those beams with a short segment length can be increased by using a wider HPBW. According to alternative example embodiments, those beams with a long segment length can be decreased by using a narrower HPBW. However, it is important to note that antenna-array directivity is inversely proportional to the HPBW; that is, a wider HPBW leads to lower antenna-array directivity, and a narrower HPBW leads to higher antenna-array directivity. Mathematically, the two quantities are related as follows [Balanis (2005), Antenna Theory: Analysis and Design]:

$$D = \frac{4\pi}{\phi_{HPBW}\theta_{HPBW}} \qquad \text{(Equation 15)}$$

As the RRH typically employs uniform rectangular antenna arrays, Equation (15) can be approximated as [Balanis (2005), Antenna Theory: Analysis and Design]:

$$D \approx \frac{\pi^2}{\phi_{HPBW}\theta_{HPBW}} \qquad \text{(Equation 16)}$$

If $\theta_{HPBW}$ and $\phi_{HPBW}$ are widened (or narrowed, i.e., more general, modified) by a factor of $\sigma_{\theta,k}$ and $\sigma_{\phi,k}$, respectively, the resultant directivity $D_k$ for Beam k obtained using Equation (16) is $$D_k = \frac{\pi^2}{(\sigma_{\theta,k}\theta_{HPBW})(\sigma_{\phi,k}\phi_{HPBW})} \qquad \text{(Equation 17)}$$

Let $D_0$ denote the original directivity in Equation (16) and dividing it by Equation (17) yields $$\frac{D_0}{D_k} = \sigma_{\phi,k}\sigma_{\theta,k} \qquad \text{(Equation 18)}$$

As compared with $D_0$, $D_k$ is now dropped by the product of $\sigma_{\phi,k}$ and $\sigma_{\theta,k}$, where both terms are real numbers. In order to ensure the link performance of Beam k is not worse than Beam 0 as a consequence of lower directivity, the product $(\sigma_{\phi,k}\ \sigma_{\theta,k})$ should be bounded by the condition $$1 \le (\sigma_{\phi,k}\sigma_{\theta,k}) \le \left(\frac{r_0}{r_k}\right)^2, \quad r_k < r_0 \qquad \text{(Equation 19)}$$

where the term $$\left(\frac{r_0}{r_k}\right)^2$$

is the difference in the free-space path loss between Beams 0 and k. Beam 0 serves as a baseline beam whose directivity equals the original given by Equation (16) and directivity for Beam k is given in Equation (17).

Alternatively, as compared with $D_0$, $D_k$ is now increased by the product of $\sigma_{\phi,k}$ and $\sigma_{\theta,k}$, where both terms are real numbers. In order to ensure the link performance of Beam k is not better than Beam 0 or the dwelling time of Beam k is not less than Beam 0 as a consequence of higher directivity, the product $(\sigma_{\phi,k}\ \sigma_{\theta,k})$ might be bounded by the condition $$\left(\frac{r_0}{r_k}\right)^2 \le (\sigma_{\phi,k}\sigma_{\theta,k}) \le 1, \quad r_0 < r_k \qquad \text{(Equation 19a)}$$

The free-space path loss for Beams 0 and k can be mathematically expressed respectively as [Balanis (2005), Antenna Theory: Analysis and Design]:

$$F_0 = \left(\frac{4\pi}{\lambda}\right)^2 r_0^2 \qquad \text{(Equation 20)}$$

$$F_k = \left(\frac{4\pi}{\lambda}\right)^2 r_k^2 \qquad \text{(Equation 21)}$$

where $\lambda$ is the wavelength of carrier frequency, $r_0$ is the radius of Beam 0, and $r_k$ the radius of Beam k.

As all the beams use the same carrier frequency for beam sweeping, the free-space path loss ratio is $$\frac{F_0}{F_k} = \left(\frac{r_0}{r_k}\right)^2 \qquad \text{(Equation 22)}$$

Equating $$\frac{D_0}{D_k} = \frac{F_0}{F_K}$$

of Equations (18) and (22) leads to $$\sigma_{\phi,k}\sigma_{\theta,k} = \left(\frac{r_0}{r_k}\right)^2 \qquad \text{(Equation 23)}$$

Equation (23) says that the drop in directivity for Beam k is cancelled by the decreased free-space path loss with reference to Beam 0 if the product $(\sigma_{\phi,k}\ \sigma_{\theta,k})$ is equal to the $$\left(\frac{r_0}{r_k}\right)^2.$$

For instance, if $$r_k = \frac{r_0}{2},$$

then the directivity D can be reduced by a factor of 4 (i.e., $\sigma_{\phi,k}\,\sigma_{\theta,k}{=}4$).

Using the enlarged azimuth HPBW $\sigma_{\phi,k}\,\phi_{HPBW}$ and elevation HPBW $\sigma_{\theta,k}\,\theta_{HPBW}$, the segment length $l_k$, width $w_k$ and dwelling time $t_k$ are recalculated for Beam k using Equations (5)-(14). As the beam segment length is increased, the number of beams required to provide the same coverage is reduced.

Figure 12:
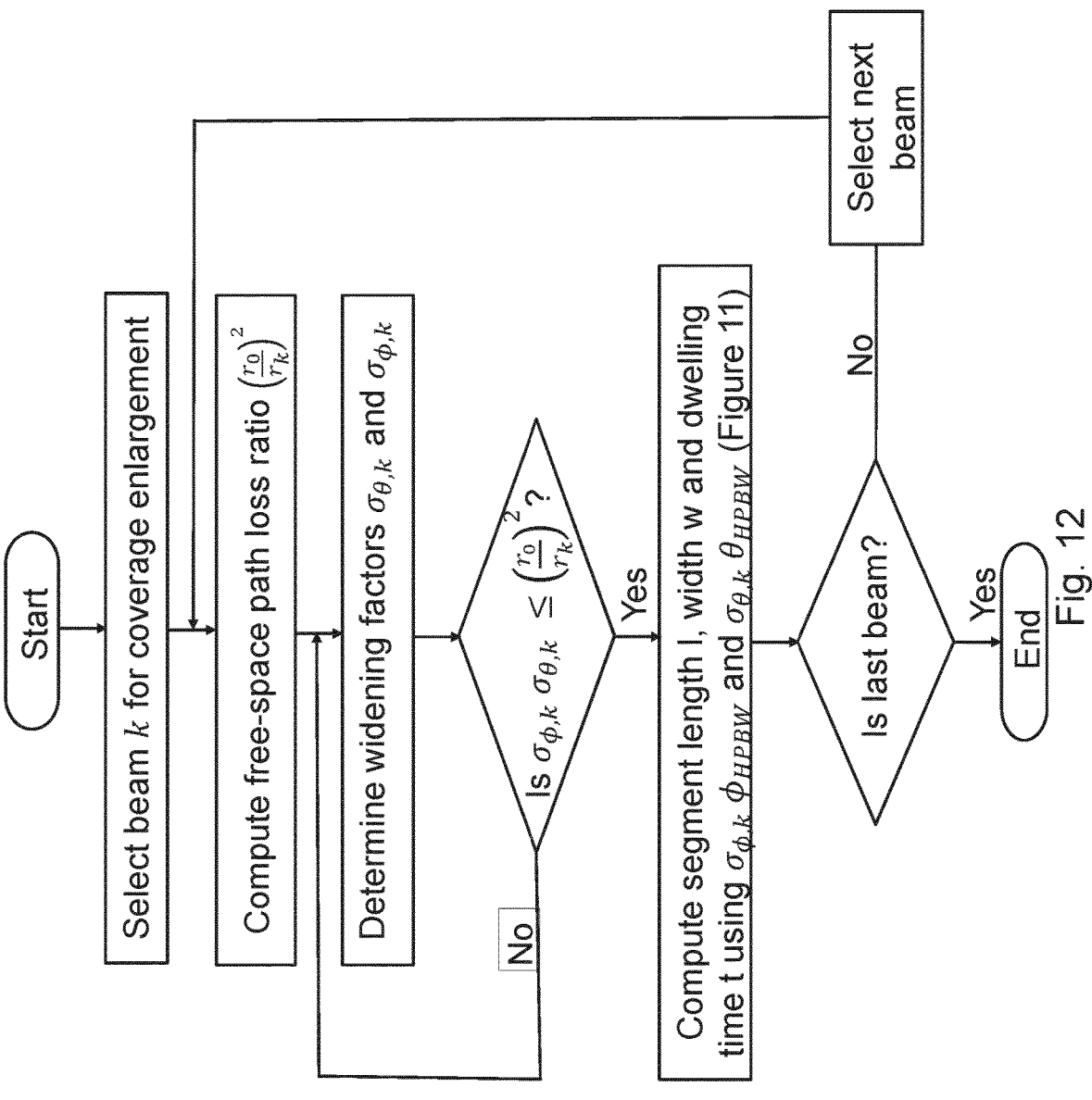
FIG. 12 is a schematic diagram of a procedure according to example embodiments.

FIG. 12 is a schematic diagram of a procedure according to example embodiments, and in particular illustrates a flowchart depicting the method for increasing beam segment length, and width according to example embodiments. More particularly, FIG. 12 depicts a flowchart of an exemplary method for increasing beam coverage by widening HPBWs.

As illustrated in FIG. 12, first, beam k for coverage enlargement is selected.

Further, a free-space path loss ratio $$\left(\frac{r_0}{r_k}\right)^2$$

is computed.

Still further, widening factors $\sigma_{\theta,k}$ and $\sigma_{\phi,k}$ are determined.

If $$\sigma_{\phi,k}\sigma_{\theta,k} \le \left(\frac{r_0}{r_k}\right)^2$$

does not apply, then widening factors $\sigma_{\theta,k}$ and $\sigma_{\phi,k}$ are determined again.

Otherwise, i.e., if $$\sigma_{\phi,k}\sigma_{\theta,k} \le \left(\frac{r_0}{r_k}\right)^2$$

applies, then segment length l, width w and dwelling time t is computed using $\sigma_{\phi,k}\phi_{HPBW}$ and $\sigma_{\theta,k}\theta_{HPBW}$ (as illustrated in FIG. 11).

If the recently processed beam is the last beam, the processing of FIG. 12 ends.

Otherwise, the next beam is selected, and the computations and determination are performed for the newly selected beam.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 13:
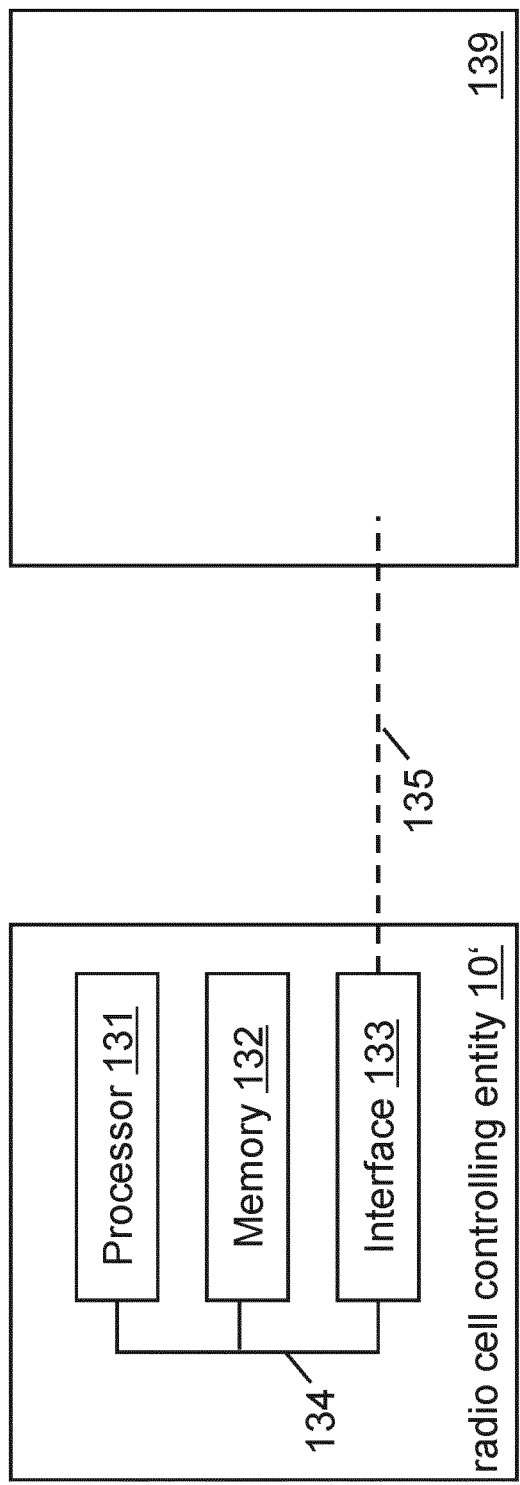
FIG. 13 is a block diagram alternatively illustrating apparatuses according to example embodiments.

In FIG. 13, an alternative illustration of apparatuses according to example embodiments is depicted. As indicated in FIG. 13, according to example embodiments, the apparatus (network entity, e.g. radio cell controlling entity) 10' (corresponding to the network entity, e.g. radio cell controlling entity 10) comprises a processor 131, a memory 132 and an interface 133, which are connected by a bus 134 or the like, and the apparatus may be connected via link 135, with another apparatus 139, e.g. with an interface of the another apparatus 139.

The processor 131 and/or the interface 133 may also include a modem or the like to facilitate communication over a (hardwire or wireless) link, respectively. The interface 133 may include a suitable transceiver coupled to one or more antennas or communication means for (hardware or wireless) communications with the linked or connected device(s), respectively. The interface 133 is generally configured to communicate with at least one other apparatus, i.e. the interface thereof.

The memory 132 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network entity, e.g. radio cell controlling entity, 10, comprises at least one processor 131, at least one memory 132 including computer program code, and at least one interface 133 configured for communication with at least another apparatus. The processor (i.e. the at least one processor 131, with the at least one memory 132 and the computer program code) is configured to perform setting a second beam width characteristic of a second beam of a beam sweep (thus the apparatus comprising corresponding means for setting), and to perform calculating said second beam width characteristic based on a first beam width characteristic of a first beam of said beam sweep and a ratio between a first path loss of said first beam between an antenna and a first position at a linear trajectory to be covered by said beam sweep and a second path loss of said second beam between said antenna and a second position at said linear trajectory (thus the apparatus comprising corresponding means for calculating).

For further details regarding the operability/functionality of the individual apparatuses, reference is made to the above description in connection with any one of FIGS. 1 to 14, respectively.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for improvement of linear beam sweeping in high speed scenarios. Such measures exemplarily comprise setting a second beam width characteristic of a second beam of a beam sweep, wherein said setting includes calculating said second beam width characteristic based on a first beam width characteristic of a first beam of said beam sweep and a ratio between a first path loss of said first beam between an antenna and a first position at a linear trajectory to be covered by said beam sweep and a second path loss of said second beam between said antenna and a second position at said linear trajectory.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

| List of acronyms and abbreviations | |
| --- | --- |
| 3GPP | Third Generation Partnership Project |
| BBU | BaseBand Unit |
| CPE | Customer Premises Equipment |
| HPBW | Half-Power Beam Width |
| NR | New Radio |
| RRH | remote radio head |
| SS | Synchronization Signal |
| UE | user equipment |

What is claimed is:

1. An apparatus comprising:

at least one processor;

at least one memory including computer program code; and at least one interface configured for communication with at least another apparatus, wherein the at least one processor, with the at least one memory and the computer program code, is configured to cause the apparatus to perform:

setting a second beam width characteristic of a second beam of a beam sweep by calculating the second beam width characteristic based on a first beam width characteristic of a first beam of the beam sweep and a ratio between a first path loss of the first beam between an antenna and a first position at a linear trajectory to be covered by the beam sweep and a second path loss of the second beam between the antenna and a second position at the linear trajectory, wherein the calculating further comprises:

determining a factor limit value as a square of a quotient of a first direct propagation length of the first beam of the beam sweep and a second direct propagation length of the second beam, wherein the first direct propagation length corresponds to the first path loss, and wherein the second direct propagation length corresponds to the second path loss;

selecting a factor based on the factor limit value; and multiplying a first beam width characteristic of the first beam with the factor.

2. The apparatus according to claim 1, wherein the first path loss corresponds to the first direct propagation length, in a first antenna boresight direction for the first beam, between the antenna and the first position, and the second path loss corresponds to the second direct propagation length, in a second antenna boresight direction for the second beam, between the antenna and the second position.

3. The apparatus according to claim 1, wherein the factor is a product of a beam width azimuth component factor and a beam width elevation component factor.

4. The apparatus according to claim 1, wherein the first direct propagation length of the first beam is longer than the second direct propagation length of the second beam, and the factor limit value is an upper limit value for the factor.

5. The apparatus according to claim 4, wherein to calculate the second beam width characteristic, the at least one processor, with the at least one memory and the computer program code, is further configured to cause the apparatus to perform:

selecting the factor such that a link performance of the second beam is not worse than a link performance of the first beam.

6. The apparatus according to claim 4, wherein to calculate the second beam width characteristic, the at least one processor, with the at least one memory and the computer program code, is further configured to cause the apparatus to perform:

selecting the factor such that a dwelling time corresponding to passing a second trajectory length of a second trajectory portion of the linear trajectory to be covered by the second beam fulfilling the second beam width characteristic with a predetermined velocity is higher than a predetermined time period.

7. The apparatus according to claim 6, wherein the predetermined time period is a minimum time period required for predetermined beam management and mobility procedures.

8. The apparatus according to claim 6, wherein the at least one processor, with the at least one memory and the computer program code, is further configured to cause the apparatus to perform:

computing the second trajectory length of the second trajectory portion based on the second beam width characteristic, the second direct propagation length, and at least one of a second azimuth beam pointing angle and a second elevation beam pointing angle, corresponding to a second antenna boresight direction for the second beam, from the antenna to the second position.

9. The apparatus according to claim 4, wherein to calculate the second beam width characteristic, the at least one processor, with the at least one memory and the computer program code, is further configured to cause the apparatus to perform:

selecting the factor such that a second dwelling time corresponding to passing a second trajectory length of a second trajectory portion of linear trajectory to be covered by the second beam fulfilling the second beam width characteristic with a predetermined velocity is not less than a first dwelling time corresponding to passing a first trajectory length of a first trajectory portion of the linear trajectory to be covered by the first beam fulfilling the first beam width characteristic with the predetermined velocity.

10. The apparatus according to claim 1, wherein the first direct propagation length of the first beam is shorter than the second direct propagation length of the second beam, and the factor limit value is a lower limit value for the factor.

11. The apparatus according to claim 10, wherein to calculate the second beam width characteristic, the at least one processor, with the at least one memory and the computer program code, is further configured to cause the apparatus to perform:

selecting the factor such that a link performance of the second beam is not better than a link performance of the first beam.

12. The apparatus according to claim 1, wherein to calculate the second beam width characteristic, the at least one processor, with the at least one memory and the computer program code, is further configured to cause the apparatus to perform:

selecting the factor such that a second trajectory length of a second trajectory portion of the linear trajectory to be covered by the second beam fulfilling the second beam width characteristic is equal to a first trajectory length of a first trajectory portion of the linear trajectory to be covered by the first beam fulfilling the first beam width characteristic.

13. The apparatus according to claim 12, wherein the at least one processor, with the at least one memory and the computer program code, is further configured to cause the apparatus to perform:

computing the first trajectory length of the first trajectory portion based on the first beam width characteristic, the first direct propagation length, and at least one of a first azimuth beam pointing angle and a first elevation beam pointing angle, corresponding to a first antenna boresight direction for the first beam, from the antenna to the first position.

14. The apparatus according to claim 1, wherein the at least one processor, with the at least one memory and the computer program code, is further configured to select the second beam width characteristic of the second beam such that a received power of the second beam is above a predetermined threshold.

15. The apparatus according to claim 1, wherein the at least one processor, with the at least one memory and the computer program code, is further configured to select the second beam width characteristic of the second beam such that a link loss of the second beam is below a predetermined threshold.

16. The apparatus according to claim 1, wherein the at least one processor, with the at least one memory and the computer program code, is further configured to cause the apparatus to perform:

computing a plurality of trajectory lengths of a plurality of trajectory portions of the linear trajectory to be covered by a plurality of beams fulfilling the first beam width characteristic based on the first beam width characteristic, a plurality of direct propagation lengths, in a plurality of antenna boresight directions for the plurality of beams, between the antenna and a plurality of positions at the linear trajectory, and at least one of a plurality of azimuth beam pointing angles and elevation beam pointing angles, corresponding to the plurality of antenna boresight directions, from the antenna to the plurality of positions at the linear trajectory; and selecting, among the plurality of beams, a beam having a longest trajectory length among the plurality of trajectory lengths as the first beam.

17. A method comprising:

setting a second beam width characteristic of a second beam of a beam sweep by calculating the second beam width characteristic based on a first beam width characteristic of a first beam of the beam sweep and a ratio between a first path loss of the first beam between an antenna and a first position at a linear trajectory to be covered by the beam sweep and a second path loss of the second beam between the antenna and a second position at the linear trajectory, wherein the calculating further comprises:

determining a factor limit value as a square of a quotient of a first direct propagation length of the first beam of the beam sweep and a second direct propagation length of the second beam, wherein the first direct propagation length corresponds to the first path loss, and wherein the second direct propagation length corresponds to the second path loss;

selecting a factor based on the factor limit value; and multiplying a first beam width characteristic of the first beam with the factor.

18. An apparatus comprising:

computing circuitry configured to compute:

a plurality of trajectory lengths of a plurality of trajectory portions of a linear trajectory to be covered by a plurality of beams of a beam sweep based on a first beam width characteristic, a plurality of direct propagation lengths, in a plurality of antenna boresight directions for the plurality of beams, between an antenna and a plurality of positions along the linear trajectory, and at least one of a plurality of azimuth beam pointing angles and elevation beam pointing angles, corresponding to the plurality of antenna boresight directions, from the antenna to the plurality of positions along the linear trajectory;

selecting circuitry, operatively coupled to the computing circuitry, the selecting circuitry configured to select, among the plurality of beams, a beam having a longest trajectory length among the plurality of trajectory lengths as a first beam;

calculating circuitry, operatively coupled to the selecting circuitry, the calculating circuitry configured to calculate a second beam width characteristic for a second beam of the beam sweep based on:

the first beam width characteristic of the first beam, and a ratio between a first path loss of the first beam between the antenna and a first position along the linear trajectory and a second path loss of the second beam between the antenna and a second position along the linear trajectory; and setting circuitry, operatively coupled to the calculating circuitry, the setting circuitry configured to set the calculated second beam width characteristic of the second beam of the beam sweep.

* * * * *